W. E. CLARKE.
EYEGLASS FRAME.
APPLICATION FILED JUNE 4, 1910.

974,860.

Patented Nov. 8, 1910.

Witnesses—

William E. Clarke,
Inventor by C. A. Snow & Co.
Attorneys

UNITED STATES PATENT OFFICE.

WILLIAM EDWIN CLARKE, OF DETROIT, MICHIGAN.

EYEGLASS-FRAME.

974,860.  Specification of Letters Patent.  Patented Nov. 8, 1910.

Application filed June 4, 1910. Serial No. 565,038.

*To all whom it may concern:*

Be it known that I, WILLIAM EDWIN CLARKE, a citizen of the United States, residing at Detroit, in the county of Wayne and State of Michigan, have invented a new and useful Eyeglass-Frame, of which the following is a specification.

It is the object of this invention to provide an eye glass frame so constructed that the lenses may readily be removed from and inserted into the frame, the device being so constructed that the lens will be rigidly and securely held in place without engaging the lens by a screw or the like, the adjustment of which might result in a breakage of the lens.

In the drawings, Figure 1 is an elevation, parts being broken away; Fig. 2 is a fragmental transverse section; and, Fig. 3 is a detail perspective of portions of the device.

The invention includes, as a primary and fundamental element, an arm 1, provided at one end with an outstanding stud 2, adapted to be received in a suitable opening adjacent the periphery of the lens 3. Adjacent the other end of the arm 1 there is a rectangularly disposed extension 5 from the end of which extends transversely of the arm 1, a resilient, arcuate strip 4, the ends of which bear against the periphery of the lens 3 to press the lens against the stud 2. There are fingers 100 at the ends of the strip 4 to overlap the lens 3. Against the end of this extension 5, the connecting spring 6 between the lenses 3 rests, the face plate 7 being superposed upon the spring 6 and the spring 6 and the face plate 7 being secured to the extension 5 by means of a screw 8 or the like. To the face plates 7 the clips proper 9, commonly fashioned from cork or celluloid are secured.

The device further includes a slidably mounted member, which, coöperating with the stud 2, serves to hold the lens 3 in place against displacement from the frame. This slidably mounted member consists of a plate 10, having an elongated opening 11. A screw 12 is mounted in this opening 11 and threaded into the extension 5 of the arm 1, the plate 10 sliding upon the screw 12. The slot 11 in the plate 10 is of sufficient length to permit the plate 10 to slide upon the screw 12 until, as shown in Fig. 1, the end of the stud 2 is located within the contour of the slot 11. The plate 10 is resilient and bears yieldingly against the lens 3. By permitting the end of the stud 2 to come within the contour of the slot 11, the lens 3 may be held securely in place, even though the stud 2 should be somewhat longer than the thickness of the lens 3, a construction seen most clearly in Fig. 2. Thus, should the stud 2 be somewhat longer than the thickness of the lens, it is not necessary to file the stud down in order that the plate 10 may have a bearing against the lens 3.

When the plate 10 has been slid into the position shown in Figs. 1 and 2 of the drawings, the screw 12 may be tightened so that the head 14 thereof will bear against the plate 10, thus holding the plate in place against sliding movement. If desired, for convenience in manipulating the plate 10, the same may be provided at its inner end, with an outstanding arm 15, adapted to be engaged by the finger of the operator.

Having thus described the invention, what is claimed is:—

1. An eye glass frame having means to engage a lens; a slotted member; and a supporting device located in the slot of said member and engaging the frame, upon which supporting member the slotted member is adapted to slide to coöperate with said means to hold the lens against displacement, the supporting member being manipulable to retain the slotted member against sliding movement.

2. An eye glass frame including an arm having a stud at one end adapted to be inserted into a lens; slotted plate slidable upon the arm and coöperating with the stud to hold the lens against displacement; and a set screw located within the slot of the plate and engaging the arm to constitute a mounting for the plate, and to constitute a means for holding the plate against movement.

In testimony that I claim the foregoing as my own, I have hereto affixed my signature in the presence of two witnesses.

WILLIAM EDWIN CLARKE.

Witnesses:
 FRANK HOUP,
 ARTHUR PORTTENS.